Jan. 12, 1965 M. B. MANLOVE 3,164,910
WHEEL ALIGNMENT INDICATING APPARATUS
Filed May 1, 1962 5 Sheets-Sheet 1

Maxwell B. Manlove
INVENTOR.

BY
Attorneys

Jan. 12, 1965    M. B. MANLOVE    3,164,910
WHEEL ALIGNMENT INDICATING APPARATUS
Filed May 1, 1962    5 Sheets-Sheet 2

Maxwell B. Manlove
INVENTOR.

Jan. 12, 1965 M. B. MANLOVE 3,164,910
WHEEL ALIGNMENT INDICATING APPARATUS
Filed May 1, 1962 5 Sheets-Sheet 5

Maxwell B. Manlove
INVENTOR.

United States Patent Office
3,164,910
Patented Jan. 12, 1965

3,164,910
WHEEL ALIGNMENT INDICATING APPARATUS
Maxwell B. Manlove, 808 E. 36th St., Topeka, Kans.
Filed May 1, 1962, Ser. No. 191,540
4 Claims. (Cl. 33—203.18)

This invention relates to new and useful apparatus for gauging the alignment of the wheels and frame of an automotive type vehicle.

An important object of the present invention is to provide mechanical type apparatus useful for the purpose of more completely checking the alignment of the wheels and the chassis or frame of automotive type vehicles of all sizes. The alignment check may thereby be performed with unexpected accuracy, in a shorter period of time and without the initial equipment cost and measuring skill usually associated with equipment utilized to perform comparable services. Also, gravitationally leveled supporting platforms are not required and irregularly worn tires and wheels may be accommodated without affecting the measurement accuracy.

In accordance with the foregoing objects, the apparatus of the present invention is capable of checking front end wheel alignment including the angular disposition of the rotational plane of the dirigible or front wheels, referred to as camber and toe, and the angular disposition of the steering axis of the dirigible wheels referred to as kingpin inclination and caster. Also in connection with the front end alignment, the steering geometry associated with the dirigible wheels may be checked. In addition to the foregoing, the vehicle chassis or frame may be checked for distortion resulting in misalignment of the rear or tracking wheels of the vehicle. Accordingly, the apparatus of the present invention may also detect such conditions as front end push back, diamond shaped frame, sway frames, bent rear axle housings, rear axle housing shifts, etc.

Another object of the present invention is to provide front end wheel alignment apparatus of a mechanical type which includes a pair of interconnected front wheel mounted instrument assemblies from which the relative camber and toe of the front wheels may be directly read from various positions including positions underneath the vehicle. The wheel mounted instruments therefore include separate camber and toe indicating wheels mounting calibrated indicia, said wheels being angularly displaceable about axes disposed perpendicular to each other, with the indicia on each of the measuring wheels including at least two separate scales so that the reading may be exposed through different windows of the instrument housing enabling one to view the reading from different locations including a location underneath the vehicle.

A further object of the present invention is to provide front end wheel alignment apparatus in accordance with the foregoing object featuring novel wheel supported structure for mounting the instrument assemblies in a level condition on the dirigible wheels. The mounting for the front end measuring assemblies is also useful in connection with a removeable type of displaceable level device for checking kingpin inclination and caster reflecting the spatial disposition of the steering axis associated with each of the dirigible wheels of the vehicle.

A still further object of the present invention is to provide rear wheel mounted deflection indicating devices interconnected with the mounted front end alignment measuring instruments for the purpose of gauging any out of line condition of the tracking wheels of the vehicle that may be caused by distortion of the vehicle chassis or the rear axle housing. Thus, a simple procedure is made available to any vehicle repair establishment for a more complete check of vehicle alignment including an inherently more accurate front end wheel alignment check through use of strictly mechanical equipment which will be less costly and require less skill to install and use as compared to any complex optical, or electrical scale reading equipment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
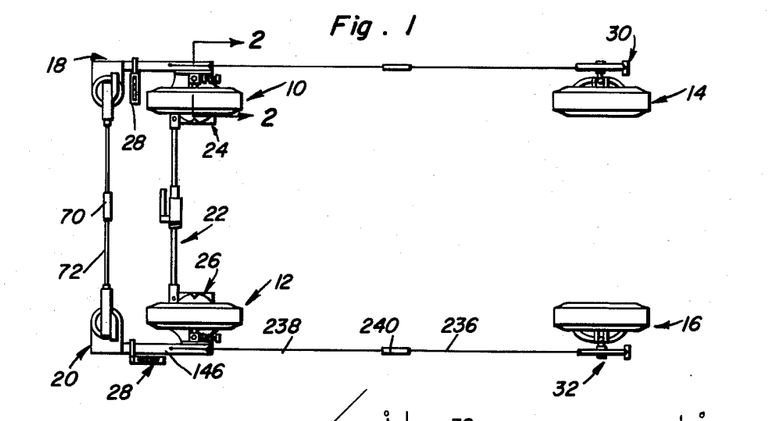
FIGURE 1 is a top plan view of the apparatus of the present invention installed on the wheels of a perfectly aligned vehicle for a scale calibration fixture.

Referring now to the drawings in detail, attention is initially invited toward FIGURE 1 wherein the various components of the apparatus of the present invention are installed on a pair of dirigible wheels 10 and 12 and associated tracking wheels 14 and 16. Thus, the measuring assemblies may be mounted on the dirigible wheels of a vehicle being checked for alignment or may be mounted on a special fixture by means of which the apparatus components may be accurately calibrated. The apparatus therefore includes a pair of front end measuring assemblies 18 and 20 respectively associated with the dirigible wheels 10 and 12 on which the assemblies are mounted, said assemblies also being operatively interconnected so as to directly provide relative camber and toe readings for the dirigible wheels 10 and 12. It will be appreciated by those skilled in the art, that the term camber refers to the angular disposition of the rotational planes of the wheels from a vertical as viewed from a vertical plane perpendicular to the straight ahead forward direction of movement of the vehicle. Camber is said to be positive if angular displacement of the rotational plane from the vertical is in a direction away from the vehicle at the top of the wheel. Toe on the other hand is the relative angular disposition of the rotational planes of the wheels as viewed from a horizontal plane. Therefore, with respect to the forward direction of vehicle movement, if the rotational planes of the wheels are closer to each other at the forward end toe-in is referred to as the condition which exists. Toe-out on the other hand exists when the wheels are closer to each other at their rear ends when viewed from above from the horizontal plane. The readings obtained from the measuring assemblies 18 and 20 will directly indicate the camber and toe relationships of the dirigible wheels 10 and 12 as hereinbefore mentioned. However, it will be further appreciated by those skilled in the art, that during forward movement of the vehicle, a toe-out thrust is applied to the dirigible wheels 10 and 12 for which reason the dirigible wheels 10 and 12 are purposely mounted on a vehicle with a predetermined amount of tie-in. When checking the front wheel alignment of a vehicle, it is therefore necessary to simulate the toe-out forces applied to the wheels before the toe relationship of the wheels may be properly gauged. Accordingly, the apparatus of the present invention includes a toe-out thrust applying device generally referred to by reference numeral 22 which is interconnected between a pair of turntable devices 24 and 26 respectively associated with the dirigible wheels 10 and 12, said turntable devices supporting said wheels thereabove. Thus, the turntable devices 24 and 26 will also be useful in checking the steering geometry of the wheels and to assist in checking the angular disposition of the steering axes associated with each of the dirigible wheels.

When viewed from a vertical plane disposed parallel to the straight ahead forward direction of movement of the vehicle, the steering axis which extends through the kingpin connection of the steering linkage to the wheel assembly will have an inclination to the vertical which is referred to as caster. Where the upper end of the kingpin is disposed forwardly in the direction of movement, the inclination is referred to as negative. When the inclination of the steering axes is viewed from a vertical plane transverse to the direction of forward movement or perpendicular thereto, the inclination of the steering axes is referred to as kingpin inclination. Both caster and kingpin inclination may be measured by use of a single displaceable leveling device generally referred to by reference numeral 28 in FIGURE 1. In the position shown on the measuring assembly 20, the leveling device 28 will provide a reading of kingpin inclination. The leveling device will also provide readings of caster when it is displaced to a position perpendicular to the previously referred to position as shown for example by the leveling device 28 in FIGURE 1 mounted on the measuring assembly 18. It will therefore be appreciated, that a single leveling device may be utilized for obtaining both kingpin and caster with respect to each of the dirigible wheels, as will be further explained hereafter. After completing a check of front end wheel alignment by the components of the apparatus as hereinbefore referred to, the aligned condition of the rear tracking wheels 14 and 16 may also be checked for which reason the devices 30 and 32 are respectively mounted on the tracking wheels 14 and 16 and interconnected with the measuring assemblies 18 and 20. After the vehicle alignment has been checked to the extent possible through the arrangement illustrated in FIGURE 1, the front end measuring assemblies 18 and 20 may replace devices 30 and 32 on the rear tracking wheels 14 and 16 in order to check the camber of the rear wheels for the purpose of detecting any bending of the rear axle housing of the vehicle in a vertical plane. This latter condition may occur as a result of excessive loads applied to the rear end of the vehicle.

Figure 5:
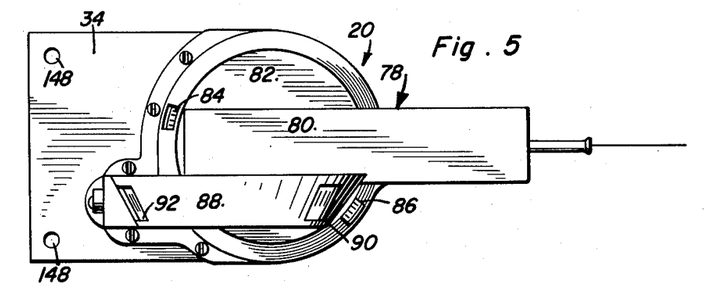
FIGURE 5 is a top plan view of one of the front end measuring assemblies.
Figure 6:
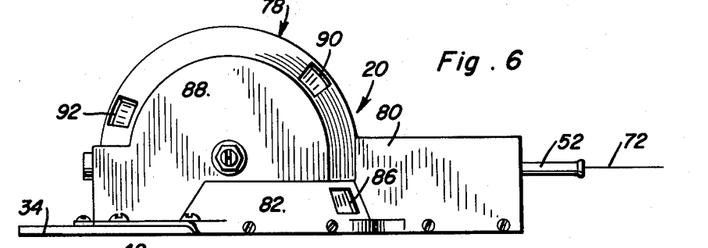
FIGURE 6 is a front elevational view of the measuring assembly illustrated in FIGURE 5.
Figures 7, 8:
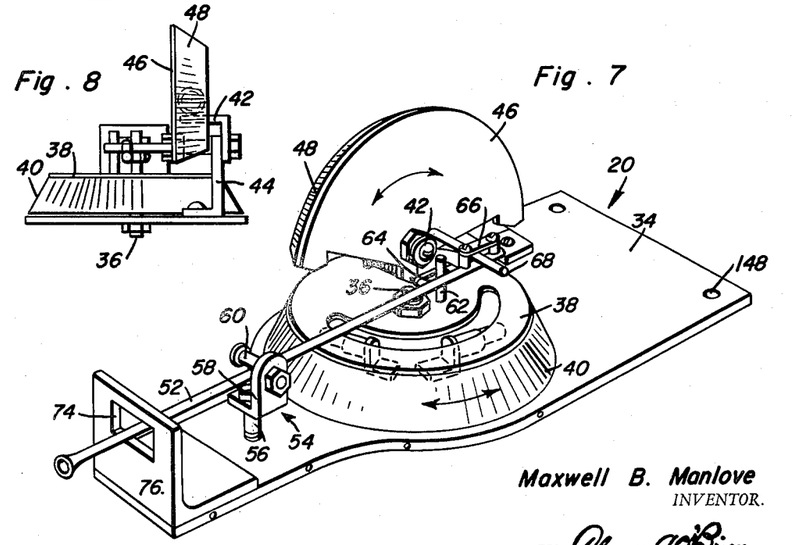
FIGURE 7 is a perspective view of the measuring assembly with the housing removed.
FIGURE 8 is a front end view of the measuring assembly with the housing removed.

Referring now to FIGURES 5 through 8, inclusive, one of the front end measuring assemblies will be described in detail, it being appreciated of course that both of the assemblies are identical in construction except that they are mirror images of each other since the assemblies will be associated with a different one of the front pair of wheels. From FIGURE 7, it will be observed that the measuring assembly 20 for example with its housing removed includes a base plate 34 on which parts are mounted. The base plate 34 fixedly mounts a spindle assembly 36 disposed perpendicular thereto for rotatably mounting parallel to a horizontal measuring plane, a toe indicating wheel 38. Toe indicating indicia is therefore printed upon the beveled peripheral face 40 of the toe indicating wheel 38. A wheel mounting spindle 42 as more clearly seen in FIGURE 8, is also mounted on the base plate 34 by the bracket member 44 and disposed perpendicular to the spindle 36 for rotatably mounting a camber indicating wheel 46. The camber indicating wheel also includes indicia bearing peripheral rim portion 48 from which camber readings are taken. The wheels 38 and 46 may be transparent at their peripheral portions so that any suitable lamp device may be mounted therebehind such as those shown primarily by broken lines, FIG. 7, in order to illuminate the indicia printed on the peripheral portions 40 and 48 of the toe and camber indicating wheels.

The angular position of the toe and camber indicating wheels will be governed by the angular disposition of a lever member 52. The lever member 52 is pivotally displaceable about axes perpendicular to each other which are respectively disposed parallel to the spindles 36 and 42 associated with the indicating wheels. A pivot assembly 54 is therefore mounted on the base plate 34 including a mounting bolt 56 secured to the base plate defining a pivot axis parallel to the indicator spindle assembly 36 permitting angular displacement of the lever 52 in a horizontal plane or parallel to the plane of the base plate 34. The lever member is mounted on the bracket member 58 pivotally connected to the bolt 56, the bracket member mounting a second pivot bolt 60 through which an axis perpendicular to the bolt 56 extends so as to permit pivotal displacement of the lever 52 in a plane perpendicular to the other pivotal plane of the lever. The lever 52 is connected to the indicator wheel 38 by means of a crankpin 62 rigidly connected to the indicator wheel 38 extending through a slot formation 64 adjacent the end of the lever. A second slot formation 66 at the end of the lever 52 receives a crankpin 68 that is rigidly connected to the indicator wheel 46. Accordingly, pivotal displacement of the lever 52 about the axis extending through the bolt 56, will cause angular displacement of the toe indicator wheel 38 without effecting displacement of the camber indicating wheel 46. Pivotal displacement of the lever 52 with respect to the axis through the bolt 60 on the other hand, will cause pivotal displacement of the camber indicating wheel 46 without effecting displacement of the toe indicating wheels 38. The angular position of each of the lever members 52 in each of the measuring assemblies will be determined by the position that the lever members must assume in order to be in line with each other. Accordingly, the lever members of each of the measuring assemblies are interconnected by some form of flexible and extensible connection. For example, a yieldable connection 70 may be interconnected by cables 72 to the ends of the lever members 52 as shown in FIGURE 1. The lever members 52 therefore extend out of the measuring assemblies through openings 74 in an enclosing plate member 76 as shown in FIGURE 7. When the base plate 34 of each of the leveled measuring assemblies is mounted on a respective dirigible wheel with zero toe and camber relative to a supporting surface, the base plates 34 will define perpendicular measuring planes with respect to which the lever members 52 will be parallel regardless of the condition of the supporting surface so as to position both indicator wheels 38 and 46 to zero readings without reliance on any gravitational reference. Where the wheels are angularly displaced from the aforesaid relative positions at some camber or toe angle, a corresponding displacement will occur in the lever members 52 by virtue of their mounting on the base plate members which in turn are mounted on the wheels, causing angular displacement of the indicator wheels. Where the vehicle wheels are displaced from the vertical position at equal camber and toe angles equal displacement of the indicating wheels 38 and 46 will occur in both measuring assemblies as indicated in the upper diagram of FIGURE 19. Where the displacement of the wheels with respect to either camber or toe is different, the lever members 52 would be disposed at some slight inclination so as to displace the indicator wheels by different amounts as indicated in the bottom diagram of FIGURE 19. It will be apparent therefore, that the linkage arrangement is such as to accurately reflect by displacement of the measuring wheels any relative angular relationship between the wheels on which the measuring assemblies are mounted to give direct readings of toe and camber.

As more clearly seen in FIGURES 5 and 6, a housing assembly generally referred to by reference numeral 78 is mounted on the base plate 34 in enclosing relation to the indicating wheels 38 and 46 and the pivot assembly 54. The housing assembly 78 therefore includes a central elongated portion 80 from which the lever member 52 extends for connection by the cables 72 to the lever member of the other measuring assembly. The central elongated portion 80 of the housing is disposed above the horizontal wheel enclosing portion 82 which encloses the toe indicating wheels 38 and includes a pair of scale exposing windows 84 and 86. The indicia bearing peripheral portion 40 of the toe indicating wheel 38 will therefore mount two scales to provide toe readings from two locations through the windows 84 and 86. Thus, the toe angle may be read by a person standing in front of the measuring assembly through the window 84 while one underneath the vehicle may also be able to read the toe angle through the window 86. The housing assembly 78 also includes a vertical wheel enclosing portion 88 which encloses the camber indicating wheel 46 and includes a pair of scale exposing windows 90 and 92 whereby camber may be read from both the front of the assembly and from underneath the vehicle as indicated with respect to the toe indicating wheel 38.

Figure 11:
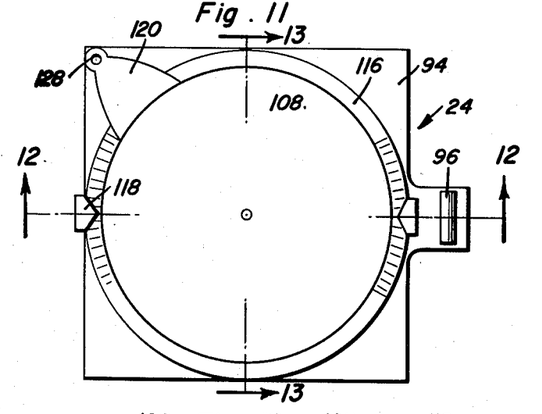
FIGURE 11 is a top plan view of one of the turntable devices utilized as part of the apparatus of the present invention.
Figure 12:
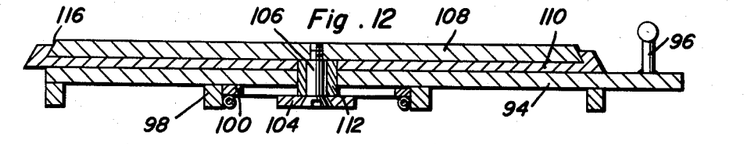
FIGURE 12 is a sectional view taken substantially through a plane indicated by section line 12—12 in FIGURE 11.
Figure 13:
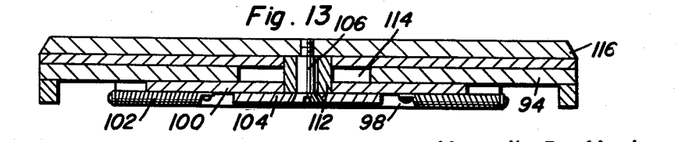
FIGURE 13 is a sectional view taken substantially through a plane indicated by section line 13—13 in FIGURE 11.

As hereinbefore indicated, the front dirigible wheels 10 and 12 are adapted to be supported upon the turntable devices 24 and 26. Referring therefore to FIGURES 11, 12 and 13, it will be observed that one of the turntable devices 24 includes a supporting plate member generally referred to by reference numeral 94 having a handle 96 mounted thereon by means of which the device may be carried to a desired location. Mounted below the support member 94, are a pair of track elements 98 for guiding slidable movement of a slide member 100. The slide member 100 is displaceable from centered position against the bias of centering spring elements 102 anchored to the track members 98 on the support member 94 and to the slide member 100 on opposite sides of a spindle supporting member 104. The spindle supporting member 104 mounts a spindle member 106 to which a turntable disk 108 is connected above a scale indicating member 110. The spindle member 106 is rotatably mounted within a sleeve 112 that is slidably mounted within a slot 114 in the support member 94 and to which the scale indicating member 110 is connected for slidable displacement therewith. A portion of the beveled rim 116 is provided with indicia for measurement of angular displacement of the disk 108 with respect to the scale indicating member 110 having a pair of scale indicating portions 118 cooperating with scales on diametrically opposite sides of the disk 108. An arm 120 is connected to the disk 108 adjacent to one corner of the support member 94 so that a predetermined torque may be applied to the disk 108 therethrough. It will therefore be apparent, that with the dirigible wheels 10 and 12 supported on the disks 108 of the turntable devices 24 and 26, the portions 118 and indicia on the rim 116 will provide means for measuring the turning angles of the wheels. Also, when thrust is applied to the disk members 108 through the arms 120 thereof the wheels may be displaced with the rotatable disk members 108 against the bias of the centering springs 102 to take up any slack in the steering linkages under driving conditions. Accordingly, thrust is applied to the arms 120 of the rotatable disk members 108 through the device 22 as hereinbefore mentioned.

Figure 9:
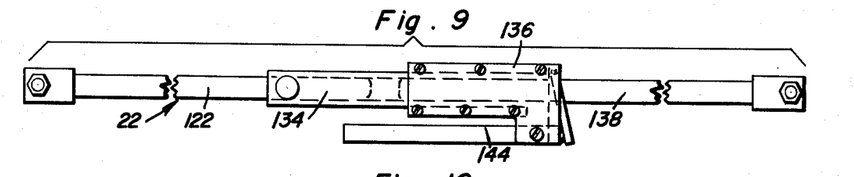
FIGURE 9 is a top plan view of a toe out thrust applying device utilized as part of the apparatus of the present invention.
Figure 10:
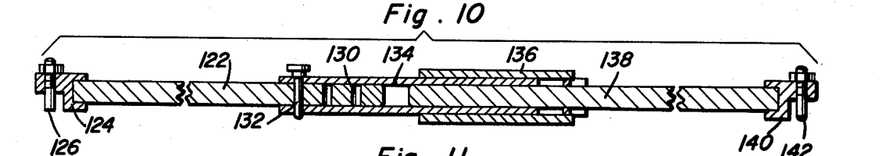
FIGURE 10 is a side sectional view of the device illustrated in FIGURE 9.

Referring now to FIGURES 9 and 10, it will be observed that the thrust applying bar device 22 includes a bar member 122 one end of which has a connecting member 124 mounting the connecting bolt or pin 126 adapted to be received within the aperture 128 in the end of the arm 120 of one of the turntable devices. The other end of the bar 122 has a plurality of apertures 130 therein through which the bar may be connected by the connecting pin 132 to a tubular connecting housing 134. The length of the thrust applying bar device 22 may therefore be adjusted for accommodating vehicles having different tread width dimensions. A releasable friction lock assembly 136 is mounted upon the connecting housing 134 for frictionally engaging a bar member 138 that extends into the tubular housing 134 and has a connecting member 140 by means of which the bar member 138 is connected to the other turntable device through the pin 142. After releasing the friction lock assembly 136 through the lever arm 144, the bar members 122 and 138 may be respectively connected through the pins 126 and 142 to the arms 120 of the turntable devices and thereafter the bar 138 extended by means of the friction lock mechanism 136 so as to apply the proper toe-out thrust to the dirigible wheels 10 and 12 causing displacement of the turntable disks 108 against the bias of the centering springs 102. Accordingly, as more clearly seen in FIGURE 1, thrust is applied through the device 22 on the forward side of the rotational axes of the wheels 10 and 12 so as to simulate the toe-out thrust applied to said wheels during forward movement of the vehicle.

Figure 2:
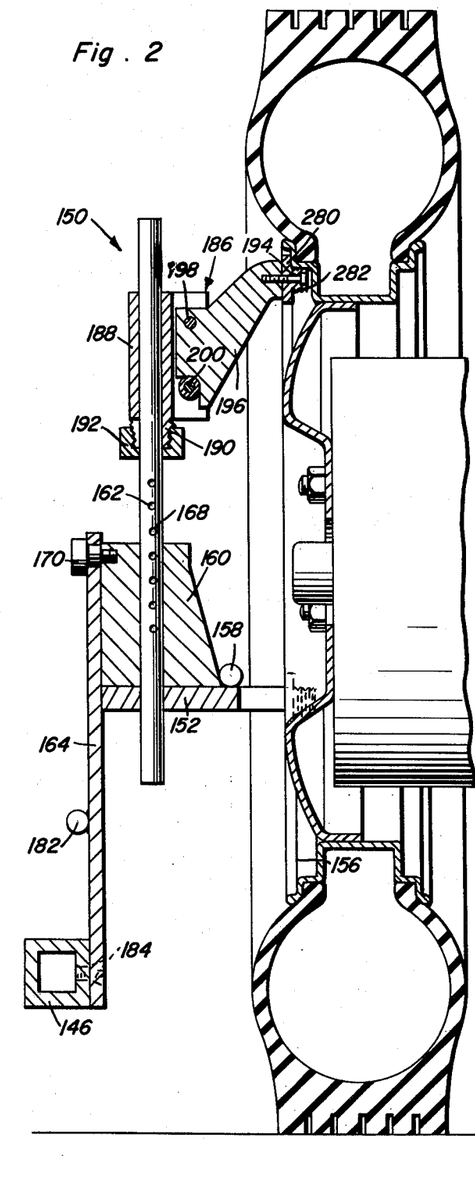
FIGURE 2 is a partial sectional view taken substantially through a plane indicated by section line 2—2 in FIGURE 1.
Figure 3:
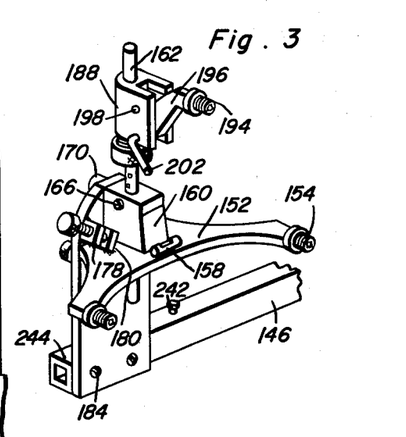
FIGURE 3 is a perspective view of the wheel support structure for mounting a front end measuring assembly.
Figure 4:
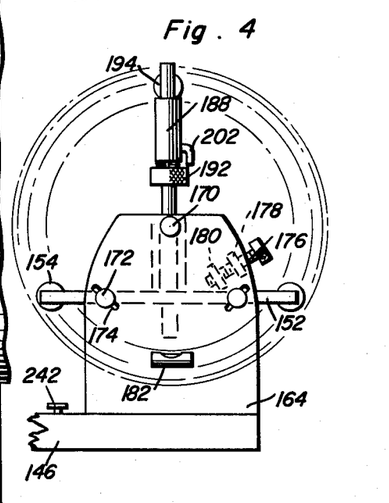
FIGURE 4 is a front elevational view of the wheel support structure illustrated in FIGURE 3.

It will be appreciated from the foregoing, that proper measurements of camber and toe by means of the measuring assemblies 18 and 20 will also depend upon the proper mounting of said assemblies on their associated wheels. The base plate member 34 of each of the measuring assemblies is therefore secured to a tubular supporting bar member 146 by fasteners extending through the apertures 148 in the base plate 34 of the measuring assemblies. The supporting bar 146 is mounted in level position on the vehicle wheel assembly by means of an adjustable wheel supported bracket assembly generally referred to by reference numeral 150 as more clearly seen in FIGURES 2, 3 and 4. The bracket assembly 150 includes a horizontally positioned member 152 opposite ends of which mount externally threaded rim engaging elements 154 arranged to frictionally engage the wheel rim portion 156 of the typical wheel structure of a vehicle wheel assembly. The horizontally positioned member 152 is therefore provided with a level indicating device 158 so that the member may be initially horizontally positioned when engaging the rim portion of the wheel by means of the elements 154. A mounting block member 160 is centrally located and fixed to the horizontally positioned member 152 for adjustably mounting a vertically adjustable shaft 162 and to pivotally mount a connecting plate member 164. Accordingly, the mounting block member 160 mounts a lock pin member 166 adapted to be received within any of the plurality of apertures 168 in the vertically positioned shaft member 162 so as to hold it in any vertically adjusted position. A pivot member 170 is also secured to the upper end portion of the mounting block member 160 to define a pivot axis with respect to which a connecting plate member 164 is pivotally adjustable. Pivotal adjustment of the plate member 164 is however limited by the projection of pin members 172 that are fixed to the horizontally positioned member 152 through arcuate slots 174 in the plate member 164. Adjustment of the plate member 164 with respect to the horizontally positioned member 152 is effected by means of an adjustment screw member 176 which is threadedly engaged within nut members 178 and 180 respectively fixed to the plate member 164 and the horizontally positioned member 152 in spaced relation to each other. It will therefore be apparent, that after the horizontally positioned member 152 has been initially leveled by the level device 158 in its engaged position with the wheel rim portion, the bracket assembly 150 may thereafter be securely fastened to the wheel rim after which final adjustments of the bracket assembly for support of the measuring assembly in level position will be acomplished by fine adjustment of the plate member 164 to a level position utilizing the level device 182 mounted on the plate member 164. The plate member 164 is therefore fastened by a spaced fastener 184 to that end of the support bar 146 opposite the end to which the base plate 34 of the measuring assembly is connected in a plane perpendicular to the plane of the plate member 164.

After the horizontally positioned member 152 has been initially engaged by means of the rim engaging elements 154 with the wheel, the bracket assembly is locked to the rim of the wheel by means of a vertically positioned locking assembly generally referred to by reference numeral 186 which is slidably mounted on the shaft member 162. The assembly 186 includes a slidable bracket member 188 having a split nut portion 190 adapted to be clamped to the shaft member 162 in an adjusted position of the bracket member 188 by means of the knurled nut element 192. Thereafter, the upper rim engaging element 194 fixed to the end of the member 196 pivotally mounted by pin 198 on the bracket member 188, is displaced into final locked position by means of an eccentric wedging element 200 rotatable by means of the locking arm 202. Thus, engagement of the wheel rim at three points by the rim engaging elements 154 and 194 assures firm support of the bracket assembly 150 on the wheel and regardless of the type and dimension of the wheel. Also, accurate leveling of the measuring assembly will be assured through the connecting bar member 146 which interconnects the level plate member 164 to the base plate of the measuring assembly.

Figure 14:
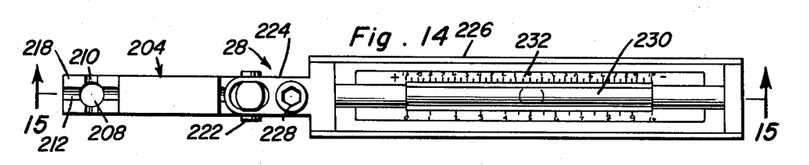
FIGURE 14 is a top plan view of the displaceable level device utilized with the apparatus of the present invention to check kingpin inclination and caster.
Figure 15:
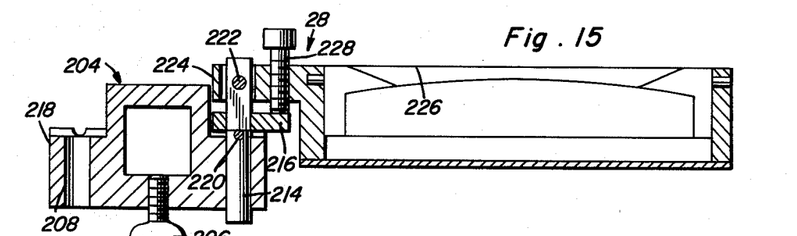
FIGURE 15 is a sectional view taken through a plane indicated by section line 15—15 in FIGURE 14.

Referring now to FIGURES 1, 14 and 15, it will be observed that each of the connecting bar members 146 is adapted to mount a displaceable level device generally referred to by reference numeral 28. A mounting member 204 is therefore adapted to be fitted over the connecting bar member 146 and secured thereto by means of a setscrew element 206. The level mounting member 204 includes portions on opposite sides of the connecting bar 146 having pivot journal bores 208 the upper ends of which communicate with perpendicular intersecting grooves 210 and 212 adapted to position the leveling device 28 in two positions perpendicular to each other. Accordingly, the leveling device includes a removable pivot pin 214 having a thrust plate member 216 fixed thereto adapted to rest on top of the laterally projecting portions 218 of the level mounting member 204. The pivot pin 214 is also provided with a pin 220 adapted to rest within one of the grooves 210 or 212 for fixedly positioning the pin in one of two positions perpendicular to each other. Pivotally connected by the pin 222 adjacent the upper end of the pivot pin 214, is a projecting arm portion 224 of a bubble type level housing 226. The level housing 226 may adjustably be positioned about the axis through the connecting pin 222 relative to the mounting 204 by means of an adjustment screw member 228 which is threadedly received through the arm 224 and engages the thrust plate member 216 fixed to the pivot pin 214. The top of the level housing 226 exposes to view the bubble tube 230 on one side of which is mounted a caster indicating scale 232 while on the other side there is mounted a kingpin inclination scale 234. It will be apparent from the foregoing description of the displaceable leveling device 28, that it may be utilized for checking the angular disposition of the steering axis or the kingpin by virtue of the mounting of the leveling device 28 on the horizontally positioned or leveled connecting bar 146. When the wheel on which the displaceable level device has been turned out to a toe-out angle of 15 degrees, the steering axis should be in a vertical position. Accordingly, after turning the wheel out by 15 degrees which may be indicated on the toe indicating wheel of the measuring assembly, the leveling housing 226 will be pivotally adjusted by means of the adjustment element 228 so as to align the bubble in the bubble tube 230 to a zero reading on either the scale 232 or the scale 234. The wheel is then turned in by 15 degrees whereupon the bubble will be displaced from its level indicating position to provide a reading on the scale 232 or the scale 234 indicating either kingpin inclination or caster. The kingpin inclination reading read on the scale 234 is obtained by the foregoing procedure when the leveling device is positioned parallel to the connecting bar 146. Caster readings on the scale 232 obtained on the other hand by positioning of the leveling device perpendicular to the connecting bar 146 as indicated by 28' in FIGURE 1. It will also be observed, that inasmuch as the leveling device may be mounted on either side of the connecting bar 146 kingpin inclination and caster may be read from different locations. It will therefore be apparent from the foregoing description, that a complete front end alignment check may be obtained by the equipment thus far described.

Figures 16, 18:
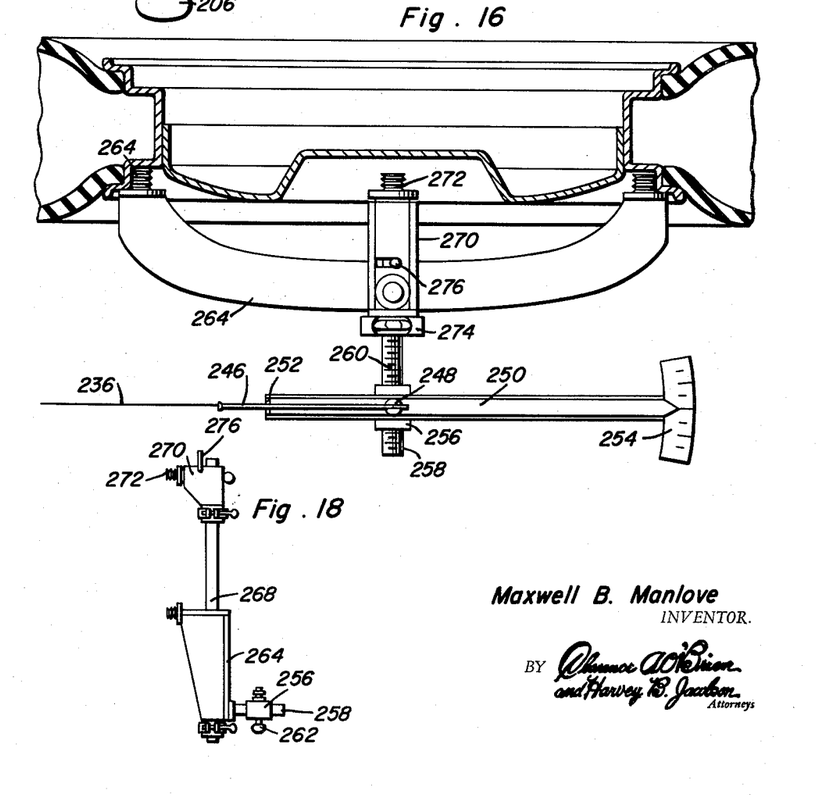
FIGURE 16 is a partial top sectional view through a rear tracking wheel of a vehicle showing the mounting thereon of the track measuring device.
FIGURE 18 is a partial side elevational view of the track measuring device.
Figures 17, 19:
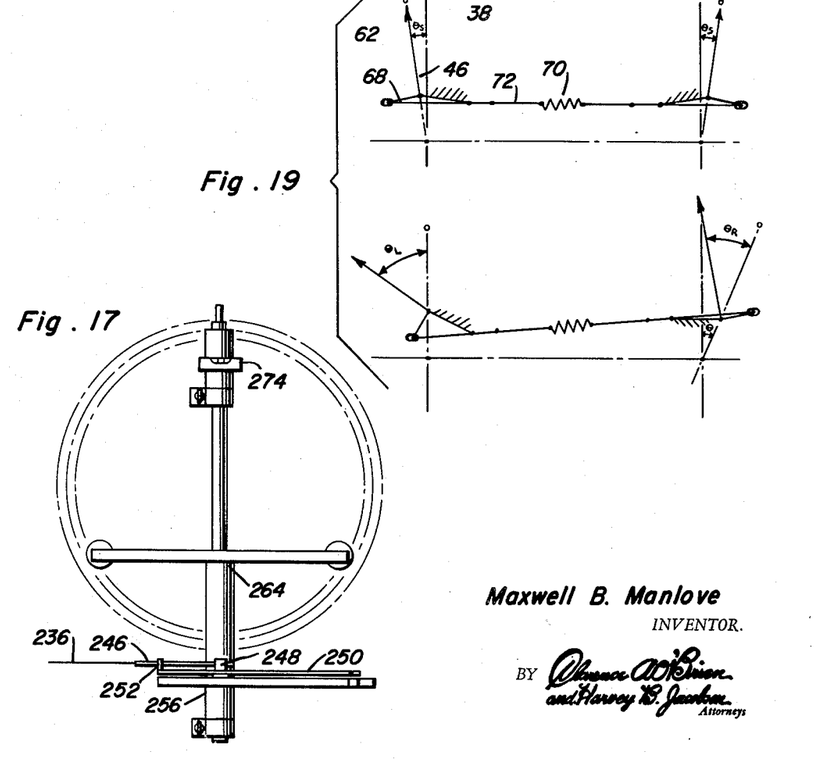
FIGURE 17 is a front elevational view of the track measuring device illustrated in FIGURE 16.
FIGURE 19 are diagrams illustrating the operating principles of the front end measuring assemblies.

Referring now to FIGURES 16, 17 and 18, and to FIGURE 1, it will be observed that each of the rear tracking wheels 14 and 16 mounts an assembly 30 or 32, each of which is interconnected to the connecting bar 146 associated with the dirigible wheels 10 and 12 by means of an extensible connection including for example the flexible cable 236 and 238 interconnected by a yieldable connecting device 240. The cable 238 is anchored to the connecting bar 146 at a point spaced from its rear end by means of anchor 242 as more clearly seen in FIGURE 3 and lined up with an alignment mark 244. The cable 236 on the other hand is connected to one end of the arm 246 fixed to the pivot member 248 of the deflection indicating lever 250 and to a connecting member 252 mounted on the deflection indicating lever 250 at one end thereof. It will therefore be apparent, that when the pivot member 248 is aligned with the longitudinal axis through the connecting bar member 146 when the associated dirigible wheel is in a zero toe position, the deflection indicating lever will indicate zero deflection on the scale portion 254 of the adjustably supported member 256 to which the pivot 248 is connected. When the pivot member 248 is out of alignment with the connecting bar member 146, the degree of misalignment will be indicated by the deflection lever 250 on the scale portion 254. It will therefore be necessary to adjustably mount the pivot supporting member 256 in spaced relation to the tracking wheel in order to achieve the aligned condition referred to. The pivot supporting member is therefore slidably mounted on a laterally extending bar member 258 having a scale 260 on the top surface, the supporting member 256 being locked in an adjusted position by means of the setscrew element 262. The laterally extending bar member 258 is therefore connected to a wheel rim engaging member 264 having fixedly secured thereto a pair of rim engaging elements 266 for engaging the rim portion of the tracking wheels. Adjustably clamped to the wheel engaging member 264, is a vertically positioned shaft 268 while a third rim engaging member 270 is also adjustably clamped in vertically adjusted position to the rod member 268. An upper rim engaging element 272 is therefore connected to the vertically adjustable member 270 to complete the mounting of the device 30 or 32 on the tracking wheel in a horizontally leveled position as determined by the level device 274 mounted on the member 270. Any suitable locking device is provided such as the angularly displaceable pin 276 for locking the element 272 in an extended rim engaging position relative to the vertically adjustable member 270. Thus, once the device 30 or 32 is properly mounted in level position on a tracking wheel, the pivot supporting member 256 may be laterally adjusted with respect to the wheel until the pivot member 248 is brought into alignment with the connecting bar 146 at a measured spacing from the tracking wheel indicated on the scale 260. For perfect alignment, each of the assemblies 30 and 32 should indicate the same lateral spacing when adjusted to obtain aligned positions of the deflections indicating levers 250.

From the foregoing description, the utility of the apparatus including its various components will be apparent. It will therefore be appreciated that by virtue of the many novel features described, the apparatus may be easily mounted on the vehicle wheels and interconnected with each other to obtain an inherently more accurate alignment check which is also of a more complete nature than was heretofore possible by the alignment checking equipment that was available to automotive repair establishments. As examples of some of the important features mentioned hereinbefore, the ability of the measuring assemblies 18 and 20 to simultaneously and directly provide toe and camber readings from various locations without requiring a level platform or uniform wheel assemblies, will be of immediate interest. Also in connection with the mounting of the components on each of the vehicle wheels, it will be observed that the engaging elements will more accurately mount the components on more accurate surfaces spaced radially inward of the rims of the wheels to avoid contact with the irregularities that develop on the rim surfaces. For example, in FIGURE 2, the engaging element 194 includes a flat flange portion 280 which abuts against the wheel to limit inward movement while the externally threaded portion 282 wedges against the horizontal annular surface. It may therefore be useful to review the procedure in utilizing the apparatus of the present invention. The various components may be mounted pre-assembled on the wheels of a vehicle after they have been calibrated properly by mounting on the wheels or on a fixture especially designed to establish the design relationships of the vehicle parts to be aligned. When checking a vehicle thereafter, the bracket assembly 150 may be mounted on each of the dirigible wheels of the vehicle and leveled by 158 when each of the wheels is positioned in a straight forward direction determined by the turntable devices 24 and 26. The front end measuring assemblies 18 and 20 preassembled on their respective bracket assemblies are fine adjusted by levels 182 and then interconnected by the extensible connections 70–72. Toe and camber readings may then be taken after the simulated toe-out thrust is applied to the wheels by means of the thrust applying device 22 interconnected between the turntable devices 24 and 26. Also, kingpin inclination and caster measurements may be taken by repositioning and pivotal displacement of the leveling device 28 as hereinbefore indicated. After the front end has been aligned or its alignment checked out, the aligned condition of the rear wheels may be checked by means of the devices 30 and 32 interconnected by extensible connections 238–240–236 to the connecting bars 146 of the front wheel measuring assemblies turned to a zero toe position as indicated by the toe indicators 38. The track measuring devices 30 and 32 are then moved in or out along spacing bars 258 until the deflection indicating levers 250 read zero. The measured lateral spacing along bars 258 of the deflection lever pivot 248 from the tracking wheels may then be compared. If they are the same and the length of the extensible cable connections are the same on both sides of the vehicle, perfect alignment is indicated should the cables 238 also be aligned over the marks 244 on the connecting bars 146. Otherwise, push back of the front frame cross member is indicated. If on the other hand, the lateral spacing associated with each of the track measuring devices 30 and 32 are different from each other, distortion of the vehicle frame is indicated. If the deflection of the deflection lever 250 cannot be removed by varying the spacing of its pivot, toe-in of the associated tracking wheel is indicated due to bending of the rear axle housing in a horizontal plane. The direction in which the deflection indicator 250 is deflected will indicate whether the bent condition produces toe-in or toe-out of the tracking wheels. If both tracking wheels indicate toe-in in opposite directions, shift of the rear axle housing is indicated. By mounting thereafter the front end measuring assemblies 18 and 20 on the rear tracking wheels, the camber indicating wheels 46 thereof may be utilized to detect camber of the rear tracking wheels due to bending of the rear axle housing in a vertical plane. It will therefore be appreciated from the foregoing, that a complete analysis may be made of any misaligned condition of the vehicle by use of the apparatus as hereinbefore outlined.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for gauging alignment of both a vehicle frame and spaced pairs of dirigible and tracking wheels mounted by the frame and the steering geometry associated with the turning of each dirigible wheel about a steering axis comprising, mechanical means operatively interconnected between said dirigible wheels for directly and simultaneously indicating relative angular toe and camber displacement of each dirigible wheel, track measuring means separately mounted on each tracking wheel in adjustably spaced relation transversely thereof and operatively connected to the mechanical means for indicating frame distortion in response to displacement of each dirigible wheel to a position of zero toe, wheel conditioning means operatively engageable with said dirigible wheels for measurement of toe and turning radius by said mechanical means, displaceable level means mounted on said mechanical means for measuring kingpin inclination and caster of each of said steering axes, said mechanical means including a pair of wheel mounted assemblies respectively including bracket means mounted on a wheel in leveled position to establish two perpendicular measuring planes, pivot means mounted on said bracket means for defining two pivotal axes intersecting perpendicular to each other and respectively disposed parallel to said perpendicular measuring planes, lever means mounted on said bracket means by said pivot means for limited displacement parallel to both measuring planes, rotational indicator means mounted by said bracket means for angular displacement about axes parallel to said two pivotal axes, calibrated indicia means mounted on said indicator means for displacement in said measuring planes, linkage means operatively connecting said lever means to the indicator means and extensible connecting means operatively interconnecting the lever means of each wheel mounted assembly for maintaining said lever means in aligned relation to each other, each of said wheel mounted assemblies including housing means fixedly mounted on the bracket means and having a plurality of scale reading openings therein for exposing said indicia means at a plurality of locations to provide alternative reading locations for both toe and camber, said track measuring means comprising a pair of wheel mounted bracket assemblies, each bracket assembly including deflection indicating means, spacing means pivotally mounting said deflection indicating means an adjustably measured distance from the wheel and flexible connecting means operatively connecting the deflection indicating means to said bracket means of one of said wheel mounted assemblies of said mechanical means, each of said wheel mounted assemblies further including wheel supported means fixedly mounting said bracket means in said leveled position forwardly spaced from a wheel having an engaging surface spaced radially inwardly from a rim portion, said wheel supported means comprising a horizontally positioned member having a pair of fixedly spaced wheel engaging elements engaging said surface, a vertically adjustable member slidably mounted on said horizontally positioned member, a surface engaging member displaceably mounted on said vertically adjustable member, locking means operatively mounted on said vertically adjustable member and engageable with said surface engaging member for displacement thereof into tight engagement with the wheel, an independently leveled connecting bracket member rigidly connected to said bracket means and pivotally connected to said horizontally positioned member and pivotal adjustment means operatively connected to said bracket member and horizontally positioned member for fine adjustment of said bracket member and bracket means to said leveled position, said wheel conditioning means comprising a pair of spring centered turntables in traction engagement with said dirigible wheels to measure turning thereof and preloaded lock bar means interconnected with said turntables for applying toe-out thrust thereto for simulating toe-out forces applied to the dirigible wheels during forward motion of a vehicle.

2. The combination of claim 1 wherein said displaceable level means comprises, mounting means replaceably mounted on each bracket member of the wheel mounted assemblies, a level device pivotally mounted on the mounting means for displacement between positions parallel to said forward direction of vehicle movement and transverse thereto and level adjustment means for pivotally adjusting the level device relative to the mounting means in both pivotal positions of the level device.

3. Apparatus for gauging alignment of both a vehicle frame and spaced pairs of dirigible and tracking wheels mounted by the frame and the steering geometry associated with the turning of each dirigible wheel about a steering axis comprising, mechanical means operatively interconnected between said dirigible wheels for directly and simultaneously indicating relative angular toe and camber displacement of each dirigible wheel, track measuring means separately mounted on each tracking wheel in adjustably spaced relation transversely thereof and operatively connected to the mechanical means for indicating frame distortion in response to displacement of each dirigible wheel to a position of zero toe, wheel conditioning means operatively engageable with said dirigible wheels for measurement of toe and turning radius by said mechanical means, displaceable level means mounted on said mechanical means for measuring kingpin inclination and caster of said steering axes, said wheel conditioning means comprising a pair of spring centered turntables in traction engagement with said dirigible wheels to measure turning thereof and preloaded lock bar means interconnected with said turntables for applying toe-out thrust thereto for simulating toe-out forces applied to the dirigible wheels during forward motion of a vehicle.

4. Apparatus for gauging alignment of a vehicle dirigible wheel comprising, a mounting member adapted for rigid connection with respect to said wheel, a vertically extending bore in said mounting member, a vertical pin received and rotatably supported in said bore and having a portion extending above said mounting member, a thrust plate secured to said pin intermediate said portion and said member, elongated level means pivotally mounted at one end thereof to said portion for vertical and horizontal pivotal motion, and adjusting means bearing between said level means and said thrust plate for adjusting said level means to a level position regardless of the pivotal position of said level means in a horizontal plane.

References Cited by the Examiner
UNITED STATES PATENTS

| 2,275,137 | 3/42 | Friestedt | 33—203.12 |
| 2,689,403 | 9/54 | Wilkerson | 33—203.18 X |
| 2,972,189 | 2/61 | Holub | 33—203.2 X |
| 3,079,695 | 3/63 | Mineck | 33—203.12 |

FOREIGN PATENTS 778,227  7/57  Great Britain.

ISAAC LISANN, *Primary Examiner.*